United States Patent
Bao et al.

(10) Patent No.: US 7,697,309 B2
(45) Date of Patent: Apr. 13, 2010

(54) OVERPOWER-PROTECTION CIRCUIT AND POWER SUPPLY APPARATUS HAVING THE SAME

(75) Inventors: You Bing Bao, Shen Zhen (CN); Wei Luo, Shen Zhen (CN)

(73) Assignee: Thomson Licensing, Issy les Moulineaux (FR)

( * ) Notice: Subject to any disclaimer, the term of this patent is extended or adjusted under 35 U.S.C. 154(b) by 114 days.

(21) Appl. No.: 11/653,634

(22) Filed: Jan. 16, 2007

(65) Prior Publication Data

US 2007/0171688 A1 Jul. 26, 2007

(30) Foreign Application Priority Data

Jan. 23, 2006 (EP) .................................. 06300053

(51) Int. Cl.
H02H 7/122 (2006.01)
H02M 3/335 (2006.01)
(52) U.S. Cl. .............. 363/56.11; 363/21.07; 363/21.15; 361/91.6
(58) Field of Classification Search .............. 363/21.07, 363/21.15, 56.01, 56.05, 56.09, 56.11, 56.12; 323/902; 361/18, 91.1, 91.4, 91.5, 91.6
See application file for complete search history.

(56) References Cited

U.S. PATENT DOCUMENTS 5,847,942 A 12/1998 Bazinet et al.
5,914,865 A * 6/1999 Barbehenn et al. ........ 363/21.15
6,434,024 B2 * 8/2002 Shirato .................... 363/21.07
6,809,939 B1 * 10/2004 Yang ....................... 363/21.14
7,394,669 B2 * 7/2008 Fahlenkamp et al. ..... 363/21.15

FOREIGN PATENT DOCUMENTS

| EP | 0 110 776 A | 6/1984 |
|---|---|---|
| EP | 0 994 558 A | 4/2000 |
| WO | WO 02/061933 A | 8/2002 |

OTHER PUBLICATIONS

"Fan7554 Versatile PWM controller Datasheet", (on line), 2003 Fairchild Semiconductor Corporation, XP002389006.
European Search Report.

* cited by examiner

*Primary Examiner*—Gary L Laxton
(74) *Attorney, Agent, or Firm*—Robert D. Shedd; Jeffrey M. Navon

(57) ABSTRACT

The present invention provides an overpower-protection circuit and a power supply apparatus having the same. The power supply apparatus comprises a rectifier, a transformer and an overpower-protection circuit The overpower-protection circuit comprises a converter having a converter input electronically coupled to the rectifier and a converter output, a photo coupler having at least a first terminal coupled with the converter output, and having an output terminal, and a clipper electrically coupled across said terminals of the photo coupler for keeping the converter output below a predetermined voltage.

12 Claims, 5 Drawing Sheets

OVERPOWER-PROTECTION CIRCUIT AND POWER SUPPLY APPARATUS HAVING THE SAME

This application claims the benefit, under 35 U.S.C. §119, of European Patent Application 06300053.3 filed Jan. 23, 2006.

FIELD OF THE INVENTION

The present invention relates generally to power supply technologies, and particularly to an overpower-protection circuit and a power supply apparatus having the same.

BACKGROUND OF THE INVENTION

Nowadays, electronic devices such as DVD players, PCs, and TVs have become absolutely necessary in people's life. However, an unexpected power break in such electronic devices occurs when power supplied to the electrical devices exceeds a threshold value. In order to protect electronic devices from damage by power break, an overpower-protection circuit is usually provided in an electronic device to shut the power down when it exceeds a threshold value. With the power's shutting down, the electronic devices are hung up and not resumed until they are restarted or plugged out/in the power supply. Such a power break not only probably damages the devices, but also scares the users. Especially, when the power break occurs, it might result in undesired data loss in the data processing device such as PCs.

FIG. 1A shows a circuit diagram of the power supply apparatus 1 having a conventional overpower-protection circuit 10.

As shown in FIG. 1A, the power supply apparatus 1 includes a rectifier 12 for rectifying the current from a power supply (AC POWER) 18. A switch transformer 14 is electrically coupled to the rectifier 12 to transform the rectified current from the rectifier 12 into a predetermined current, which is in turn applied to the load 20 via a load protection circuit 108 that is formed of a capacitor $C_1$, a Zener diode $ZD_1$ and resistors $R_1$, $R_2$, $R_3$, and $R_5$.

The power supply apparatus 1 is also equipped with a conventional overpower-protection circuit 10, including a photo coupler 104 and a DC-DC converter 102 providing a switching voltage for the operation of the switch transformer 14. The converter 102 has its first input electrically coupled with the rectifier 12 and second input (pin FB) 102*a*. The photo coupler 104 is formed of a LED 104*a* optically coupled to a transistor 104*b*. The transistor 104*b* has its collector electrically coupled with second input (pin FB) 102*a* of the converter 102 and its emitter be grounded.

The LED 104*a* has its anode electrically coupled with the load 20 via resistor $R_1$ and its cathode electrically coupled with the load 20 too, via capacitor $C_1$ and two resistors $R_2$ and $R_3$, as shown in FIG. 1A.

FIG. 1B shows the circuit of the power supply apparatus 1 in detail. As shown in FIG. 1B, the power supply (AC POWER) 18 has the voltage in a range of 85~265V and the frequency of 50/60 Hz. The rectifier 12 includes a bridge of diodes BD, which rectifies the current from the power supply (AC POWER) 18 from AC current to DC current, and outputs the rectified current to the switch transformer 14 and to the DC-DC converter 102 via a pair of resistors (R101, R102) coupled in parallel. The switch transformer 14 includes transforming coils T101 for transforming the voltage corresponding to the rectified current from the rectifier 12 into a predetermined voltage, and applying the predetermined voltage to a load 20. In FIG. 1B, the input voltage and current of the load 20 are 12V and 3.5 A respectively. The DC-DC converter 102 is an IC chip of eight pins, whose model number is FAN7554, manufactured by Fairchild Semiconductor Corporation in U.S.A., and available in market since 2003.

FIG. 1C shows the circuit diagram of the FAN7554 as shown in FIG. 1B.

The FAN7554 has many built-in protection circuits that do not need additional components, providing reliability without cost increase. These protection circuits have the auto-restart configuration. In this configuration, the protection circuits reset when Vcc is below UVLO stop threshold (9V) and restarts when Vcc is above UVLO start threshold voltage (15V).

Abnormalities may occur in the SMPS secondary side feedback circuit. First, when the feedback pin is short to the ground, the feedback voltage is zero and the FAN7554 is unable to start switching. Second, when the feedback circuit is open, the secondary voltage generally becomes much greater than the rated voltage as the primary side continues to switch at the maximum current level. This may cause the blowing off the fuse or, in serious cases, fires. It is possible that the devices directly connected to the secondary output without a regulator could be destroyed. Even in these cases, the over voltage protection circuit operates. Since Vcc is proportional to the output, in an over voltage situation, it also will increase. In the FAN7554, the protection circuit operates when Vcc exceeds 34V. Therefore, in normal operation, Vcc must be set below 34V.

An overload is the state in which the load is operating normally but in excess of the preset load. The overload protection circuit can force the FAN7554 to stop its operation. The protection can also operate in transient states such as initial SMPS operation.

Because the transient state returns to the normal state after a fixed time, the protection circuit need not to operate during this time. That is, the FAN7554 needs the time to detect and decide whether it is an overload condition or not. The protection circuit can be prevented from operating during transient states by ensuring that a certain amount of time passes before the protection circuit operates. The above operations are executed as follows: Since the FAN7554 adopts a current mode, it is impossible for current to flow above a maximum level. For a fixed input voltage, this limits power. Therefore, if the power at the output exceeds this maximum, Vo, becomes less than the set voltage, and the KA431 pulls in only the given minimum current. As a result, the photo-coupler's secondary side current becomes zero. The same goes for the photo-coupler's primary side current. Consequently, when the full current 1 mA flows through the internal resistor (2R+R=3R), Vfb becomes approximately 3V and from that time, the 5 uA current source begins to charge Cfb, the photo-coupler's secondary current is almost zero. The FAN7554 shuts down when Vfb reaches 6V.

The pin definitions of the FAN 7554 are listed in the below table.

| Pin Number | Pin Name | Pin Function Description |
| --- | --- | --- |
| 1 | FB | Inverting (−) input of pwm comparator, on/off control & OLP sensing terminal. |
| 2 | S/S | Soft start |
| 3 | IS | Non-inverting (+) input of PWM comparator, OCL sensing terminal |
| 4 | Rt/Ct | Oscillator time constant(Rt/Ct) |
| 5 | GND | Ground |

-continued

| Pin Number | Pin Name | Pin Function Description |
|---|---|---|
| 6 | OUT | Output of gate driver |
| 7 | Vcc | Power supply |
| 8 | Vref | Output of 5 V reference |

FIG. 2 is a schematic diagram showing the operational principle of power supply apparatus 1 having a conventional overpower-protection circuit 10, as shown in FIG. 1A.

As shown in FIG. 2, $P_1$ represents an expected power and $P_2$ a threshold power from power supply apparatus 1. When $P_1$ does not exceed $P_2$, voltage on the load 20 linearly varies as the current. However, when $P_1$ exceeds $P_2$, as shown in FIG. 2, the overpower-protection circuit 10 works to initiate the overpower protection, bringing the power on the load 20 to zero. This might not only scare the user but also damage the device and/or the data in processing.

To solve the problems, what is needed is an overpower-protection circuit and a power supply apparatus having the same, which can output voltage declines smoothly when current rises continuously, avoiding or eliminating the damage to the devices.

SUMMARY OF THE INVENTION

In accordance with the present invention, a power supply apparatus equipped with an overpower-protection circuit is provided.

The power supply apparatus in accordance with the present invention comprises a rectifier for rectifying the current from a power supply, a transformer for transforming the voltage corresponding to the rectified current from the rectifier into a predetermined voltage, and applying the predetermined voltage to a load, and an overpower-protection circuit.

In accordance with the present invention, the overpower-protection circuit comprises a converter having a converter input electronically coupled to the rectifier and a converter output; a photo coupler having at least a first terminal coupled with the converter output, a second terminal grounded, and an output terminal; and a load protection circuit coupled between the output terminal and the load.

The overpower-protection circuit further comprises a clipper electrically coupled over to the first and second terminals of the photo coupler for keeping the converter output at a predetermined voltage.

In accordance with one aspect of the present invention, the photo coupler includes a LED optically coupled with a transistor that has a first transistor terminal electrically coupled with the converter output and a second transistor terminal be grounded, and the LED is coupled to the load protection circuit.

In particular, the transistor has its collector electrically coupled with the converter output and its emitter be grounded, and the LED has its LED anode and its LED cathode coupled to the load protection circuit.

In another aspect of the present invention, the clipper is a diode, preferably a Zener diode, with its first diode terminal electrically coupled with the first transistor terminal, and its second diode terminal electrically coupled with the second transistor terminal. In particular, the diode has its cathode electrically coupled with the transistor's collector, and its anode electrically coupled with the transistor's emitter.

In accordance with another aspect of the present invention, the overpower-protection circuit further comprises a resistant element, preferably a resistor, electrically coupled over the LED.

Other aspects, advantages and novel features of the present invention will become more apparent from the following detailed description when taken in conjunction with the accompanying drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

The technical features of the present invention will be described further with reference to the embodiments. The embodiments are only preferable examples without limiting to the present invention. It will be well understood by the skilled person in the art upon reading the following detail description in conjunction with the accompanying drawings.

Figure 1A:
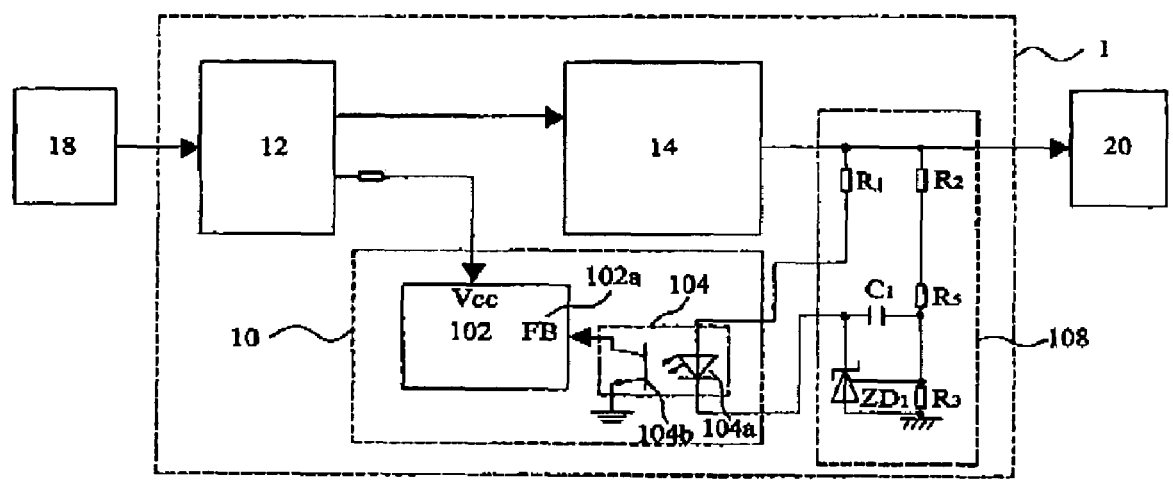
FIG. 1A shows a circuit diagram of the power supply apparatus 1 having a conventional overpower-protection circuit 10.
Figure 1B:
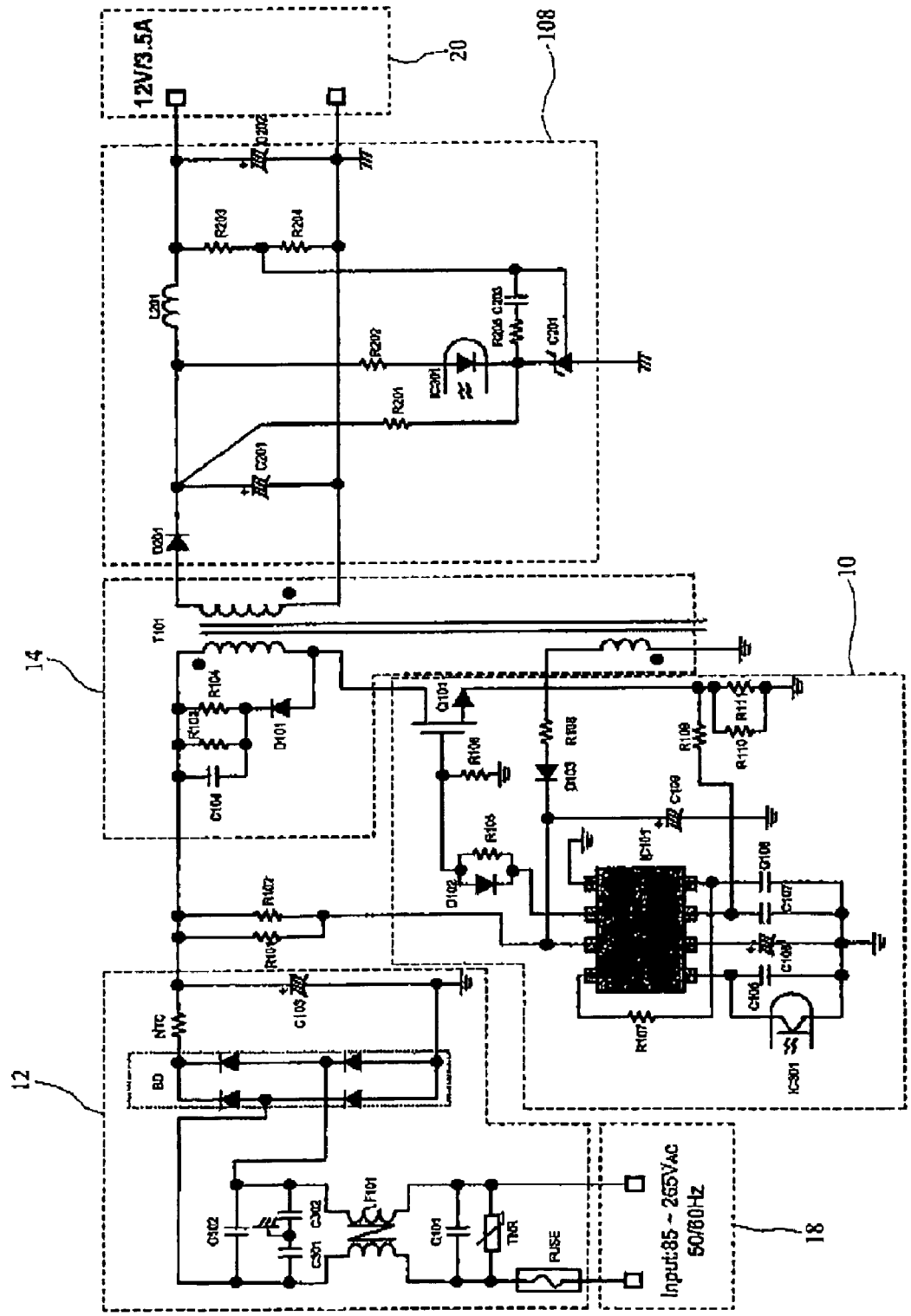
FIG. 1B shows a circuit of the power supply apparatus 1.
Figure 1C:
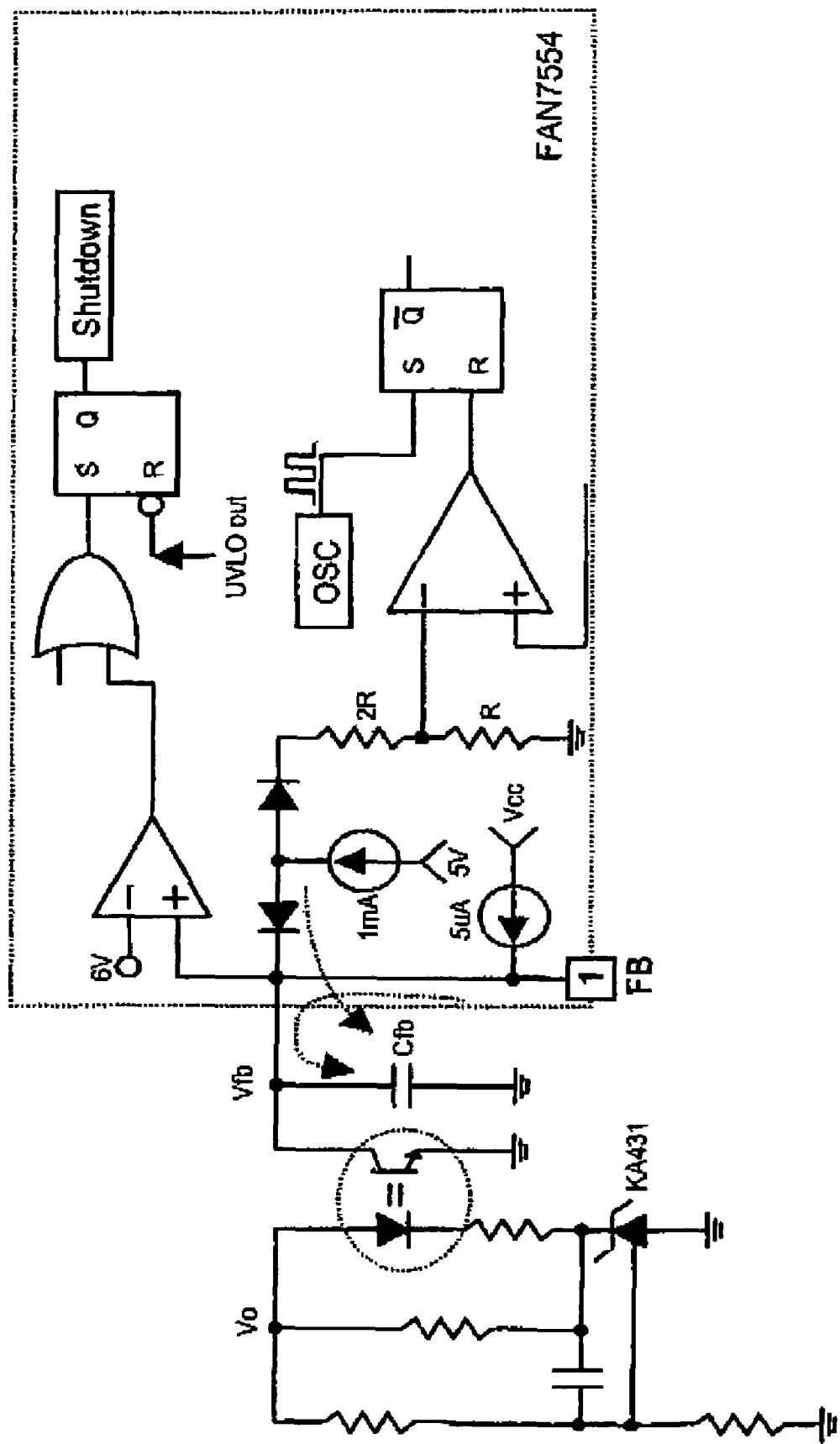
FIG. 1C shows the circuit diagram of the FAN7554 as shown in FIG. 1B.
Figure 2:
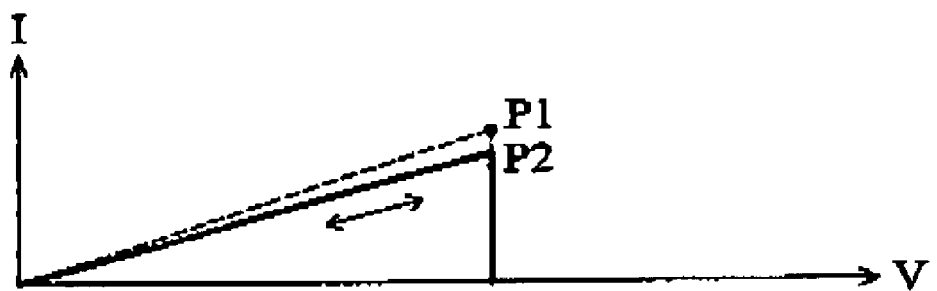
FIG. 2 is a curve diagram showing the expected power and the threshold power from the power supply apparatus 1.
Figure 3:
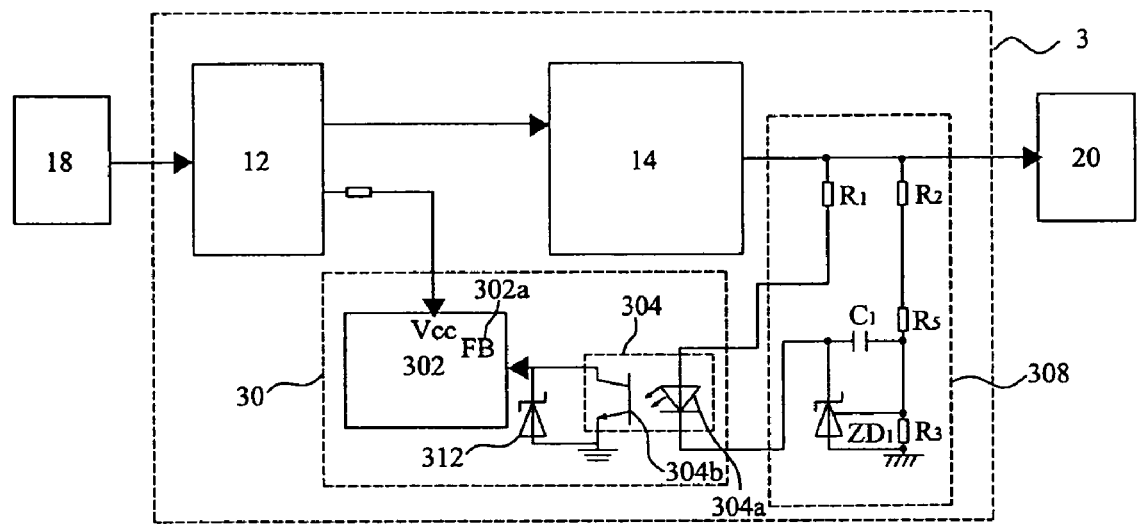
FIG. 3 is a circuit diagram showing the power supply apparatus 3 in accordance with the first embodiment of the present invention.

As shown in FIG. 3, power supply apparatus 3 in accordance with the first embodiment has an improved overpower-protection circuit 30. The overpower-protection circuit 30 differs from conventional power supply apparatus 1 as shown in FIG. 1 in that the overpower-protection circuit 30 further comprises a clipper 312 electrically coupled over the terminal (pin FB) 302a of converter 302 and ground, to keep the output of the terminal 302a at a predetermined value, allowing the converter 302 to work normally when the power on the load 20 exceeds a threshold value. In particular, when a Zener diode is added as the clipper, the voltage at pin 1 of the IP chip, as shown in FIG. 1B, does not reach 6V. As a result, the output of the load can still be increased.

The clipper 312 could be any kind of devices capable of keeping the power at first terminal 302a of the converter 302 at a predetermined value. In the present embodiment, while clipper 312 is a diode, more preferably, with its anode and cathode electrically coupled to collector and emitter of the transistor 304b, many kinds of diodes are available.

Figure 5:
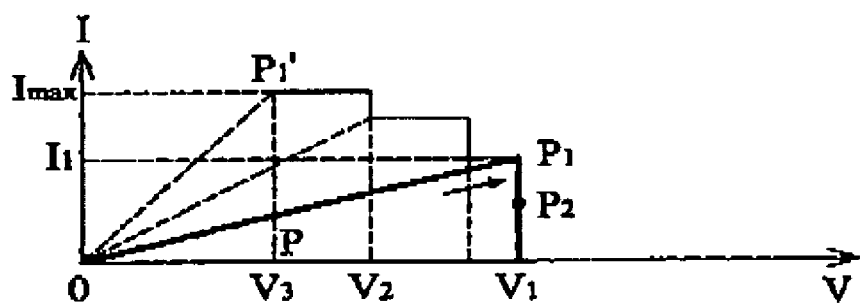
FIG. 5 is a curve diagram showing the change of the voltage output from the power supply apparatus 3.

As shown in FIG. 5, $P_1$ represents an expected power while $P_2$ a threshold power, output from power supply apparatus 3 of FIG. 3. When $P_1$ is not more than $P_2$, the voltage on the load 20 varies linearly with the current. However, when $P_1$ exceeds $P_2$, overpower-protection circuit 30 starts to work, which, due to the clipper, for example a Zener diode, forces the output of "FB" at a predetermined value, so that the converter 302 cannot enable the internal overpower protection.

When the power reaches the value of $P_1$ and the current exceeds "$I_1$", the converter 302 enables the internal overcurrent protection. If the current keeps increasing, the voltage on the load 20 falls down simultaneously. In particular, as the current increases up to "$I_{max}$", the voltage on the load 20 drops down to $V_3$, and the power becomes $P_1'$, as shown in FIG. 5.

However, in case that the current changes so quickly that the voltage cannot follow tightly, the voltage decreases like ladders, as shown in FIG. 5.

Figure 4:
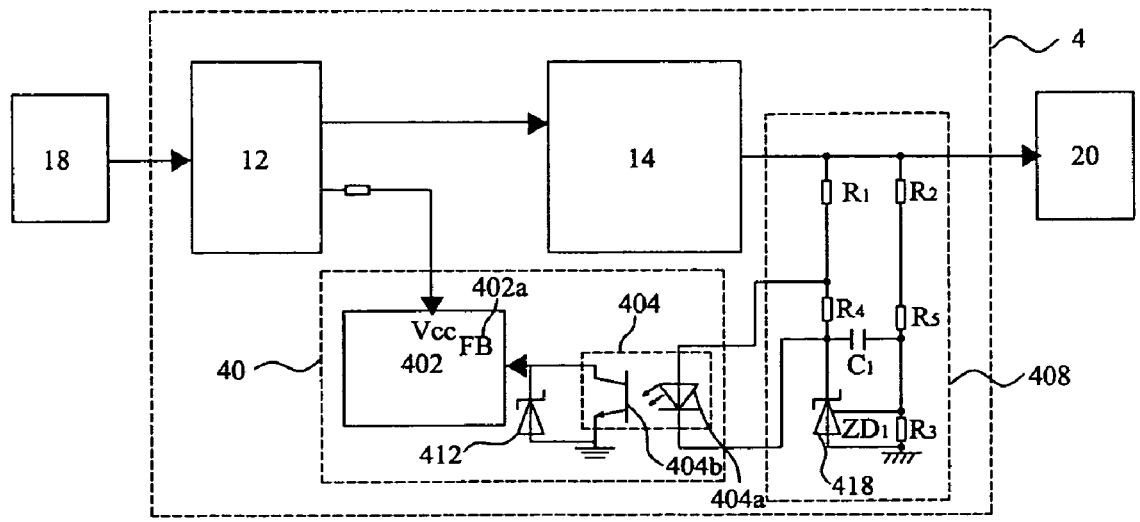
FIG. 4 is a circuit diagram showing the power supply apparatus 4 in accordance with the second embodiment of the present invention.

In order to avoid the above-mentioned problems, in accordance with the second embodiment, a resistant element $R_4$ is arranged to electrically couple over to the anode and the cathode of LED 404a, as shown in FIG. 4.

Figure 6:
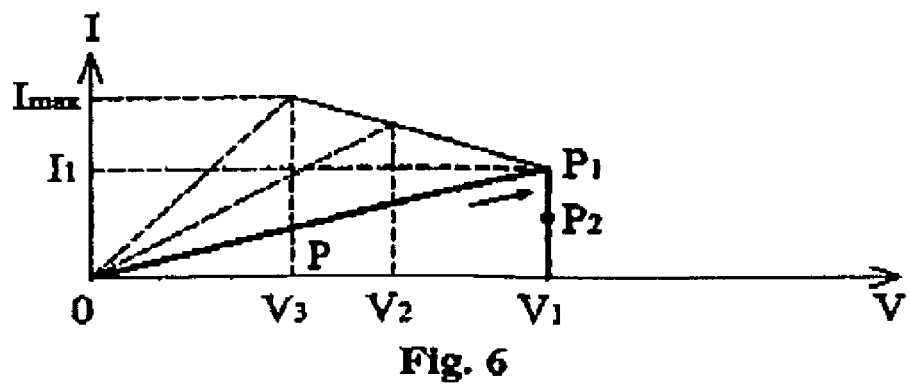
FIG. 6 is a curve diagram showing the smooth change of the voltage output from the power supply apparatus 4 of FIG. 4.

The resistant element $R_4$ is preferably a resistor. With its addition, the capability of overpower protection circuit 40 is boosted up. As a result, the voltage decreases smoothly as the current increases, as shown in FIG. 6.

In accordance with the present embodiment, the electronic devices equipped with overpower protection circuit 30, 40 and/or power supply apparatus 3, 4 having the same are able to output a voltage that declines smoothly as the current increases continuously, and is not shut down unexpectedly. Therefore, the devices' damage or data lost may be avoided.

In a preferred embodiment, the power supply apparatus 4 as shown in FIG. 4 provides about 200 w power at its output for an audio amplifier as the load 20. At its pin 7 of FAN7554, when a normal $V_{CC}$ voltage is reached, FAN7554 starts to work and then, a regulated 36V voltage is provided at the output for the load. The pin 6 of FAN7554 delivers a drive signal, which is shut when the voltage at the pin 1 is higher than 6V because of its inherent function of over load protection. Because a clipper 412, a Zener diode of 5, 6 V is used, the voltage at pin 1 will not reach 6 V and as the result the load at the output can still increase.

Pin3 of IC102 is for detecting the current of the switching transistor, transistor Q101 of FIG. 1B. In other words, pin 3 can be used for setting the system power. When the voltage at this pin arrives at 2V, the IC will switch off the switching transistor via pin6, and as the result, the output voltage for the load declines. In the other hand, if the current of the load decreases, the output voltage will rise again. During the time, the maximum power output is maintained, when the voltage at pin3 is below 2V, and the output voltage of the system will arrive at 36V again. The remaining components have the following values: R1=1 k, R2=6,8 k, R3=1 k, R4=5,1 k, R5=6,8 k, C1=10 μF. Whilst there has been described in the forgoing description preferred embodiments and aspects, it will be understood by those skilled in the art that many variations in details of design or construction may be made without departing from the present invention. The present invention extends to all features disclosed both individually, and in all possible permutations and combinations.

The invention claim is:

1. A power supply apparatus comprises:
a rectifier for rectifying the current from a power supply;
a transformer for transforming the voltage corresponding to the rectified current from the rectifier into a predetermined voltage and applying the predetermined voltage to a load; and
an overpower-protection circuit comprising:
a converter having an internal overpower-protection circuit and an overcurrent protection circuit, a converter input electronically coupled to the rectifier and a converter output;
a photo coupler having at least a first terminal coupled with the converter output, and having an output terminal; and
a clipper electrically coupled across said terminals of the photo coupler, the clipper providing a threshold for said converter output, which is below a threshold of said internal overpower-protection circuit for disabling said internal overpower-protection circuit.

2. The power supply apparatus according to claim 1, wherein the photo coupler includes a LED optically coupled with a transistor, the transistor has a first transistor terminal electrically coupled with the convener output and a second transistor terminal connected to ground, and the LED is coupled to a load protection circuit.

3. The power supply apparatus according to claim 2, wherein the transistor has a collector electrically coupled with the converter output and an emitter grounded, and the LED has a first LED terminal and a second LED terminal coupled to the load protection circuit.

4. The power supply apparatus according to claim 3, wherein the first LEO terminal is an anode and the second LED terminal is a cathode.

5. The power supply apparatus according to claim 2, wherein the clipper is a diode with a first diode terminal electrically coupled with the first transistor terminal, and a second diode terminal electrically coupled with the second transistor terminal.

6. The power supply apparatus according to claim 3, wherein the clipper is a diode with a cathode electrically coupled with the collector, and an anode electrically coupled with the emitter.

7. The power supply apparatus according to claim 6, wherein the diode is a Zener diode.

8. The power supply apparatus according to claim 1, further comprising a load protection circuit which includes:
a resistor ($R_4$) coupled across first and second LED terminals of the LED of the photo coupler.

9. An overpower-protection circuit comprises:
a converter having an internal overpower-protection circuit and an overcurrent protection circuit, a converter input for receiving a rectified current and a converter output;
a photo coupler having at least a first terminal coupled with the converter output and having an output terminal; and
a clipper electrically coupled across said terminals, the clipper providing a threshold for said converter output, which is below a threshold of said internal overpower-protection circuit for disabling said internal overpower-protection circuit.

10. The overpower-protection circuit according to claim 9, wherein the photo coupler includes a LED optically coupled with a transistor, the transistor has a first transistor terminal electrically coupled with the converter output and a second transistor terminal grounded, and the LED is coupled to the load protection circuit.

11. The overpower-protection circuit according to claim 10, wherein the clipper is a diode, for example a Zener diode, with a first diode terminal electrically coupled with the first transistor terminal, and a second diode terminal electrically coupled with the second transistor terminal.

12. The power supply apparatus according to claim 9, further comprising a load protection circuit which includes:
a first resistor ($R_1$) connected between the load and the first LED terminal in series;
a second resistor ($R_2$), at least a third resistor ($R_3$), and a diode $ZD_1$, which are connected between the load and the second LED terminal in series;
a capacitor $C_1$ connected in parallel with the diode $ZD_1$ and the third resistor ($R_3$); and
a forth resistor ($R_4$) coupled over to the first and second LED terminals of the LED.

* * * * *